(12) United States Patent
Ostby et al.

(10) Patent No.: US 7,807,945 B2
(45) Date of Patent: Oct. 5, 2010

(54) METHOD FOR FABRICATING HELICAL GEARS FROM PRE-HARDENED FLAT STEEL STOCK

(75) Inventors: Erik Jan Ostby, Branford, CT (US); Brian David Bourgoin, East Haddam, CT (US); Jeffrey Mark Briggs, Madison, CT (US); Craig Charles Tooker, East Lyme, CT (US)

(73) Assignee: Roto Frank of America, Inc., Chester, CT (US)

( * ) Notice: Subject to any disclaimer, the term of this patent is extended or adjusted under 35 U.S.C. 154(b) by 1168 days.

(21) Appl. No.: 11/263,212

(22) Filed: Oct. 31, 2005

(65) Prior Publication Data

US 2007/0095804 A1    May 3, 2007

(51) Int. Cl.
*B23K 26/00* (2006.01)

(52) U.S. Cl. .............................. 219/121.72; 219/121.67; 219/121.85

(58) Field of Classification Search ............ 219/121.72, 219/121.67, 121.85; 49/341, 342; 74/89.13, 74/89.14, 89.17, 89.18; 428/66.1
See application file for complete search history.

(56) References Cited

U.S. PATENT DOCUMENTS

| | | | | |
|---|---|---|---|---|
| 1,670,475 A | * | 5/1928 | Nicholson | 29/893.33 |
| 2,949,042 A | * | 8/1960 | Bennett | 74/425 |
| 3,039,764 A | * | 6/1962 | Heinsman et al. | 49/21 |
| 3,767,389 A | * | 10/1973 | Floreen | 420/34 |
| 4,010,345 A | * | 3/1977 | Banas et al. | 219/121.84 |
| 4,288,680 A | * | 9/1981 | Roder | 219/121.67 |
| 5,344,502 A | * | 9/1994 | Mack et al. | 148/236 |
| 5,380,976 A | * | 1/1995 | Couch et al. | 219/121.44 |
| 5,444,211 A | * | 8/1995 | Nakata et al. | 219/121.67 |
| 5,746,842 A | * | 5/1998 | Eguchi et al. | 148/319 |
| 5,760,368 A | * | 6/1998 | Nakata | 219/121.72 |
| 5,802,913 A | * | 9/1998 | Winner | 74/89.18 |
| 5,855,397 A | * | 1/1999 | Black et al. | 285/93 |
| 5,951,427 A | * | 9/1999 | Schroeder | 475/178 |
| 6,330,836 B1 | * | 12/2001 | Watanabe et al. | 74/434 |
| 6,672,010 B1 | | 1/2004 | Gledhill et al. | |
| 2002/0124707 A1 | * | 9/2002 | Izard | 83/835 |
| 2002/0179188 A1 | * | 12/2002 | Yamaguchi et al. | 148/218 |
| 2004/0064947 A1 | * | 4/2004 | Yanagimoto et al. | 29/893.3 |
| 2006/0065345 A1 | * | 3/2006 | James et al. | 156/64 |

* cited by examiner

*Primary Examiner*—M. Alexandra Elve
(74) *Attorney, Agent, or Firm*—Miller, Matthias & Hull

(57) ABSTRACT

An improved method of cutting a helical gear sector onto a pivoting arm of a casement window is disclosed. The method includes beginning with a pre-hardened flat sheet of steel stock and cutting the arm and the helical gear sector of the arm in two steps. The non-toothed portions of the arm are cut with a laser and nitrogen assist or shielding gas to prevent any oxidation to the non-toothed portions of the structure. The helical gear sector is also cut with a laser, but using oxygen assist gas. Use of the oxygen prevents recasts slag from accumulating in the gear sector. Thus, a finished part is completed with two laser cutting operations thereby eliminating the need for separate stamping, shaping, deburring and subsequent heat treatment processes used in conventional manufacturing methods. The subsequent heat treating is eliminated because a pre-hardened steel stock may be utilized.

10 Claims, 3 Drawing Sheets

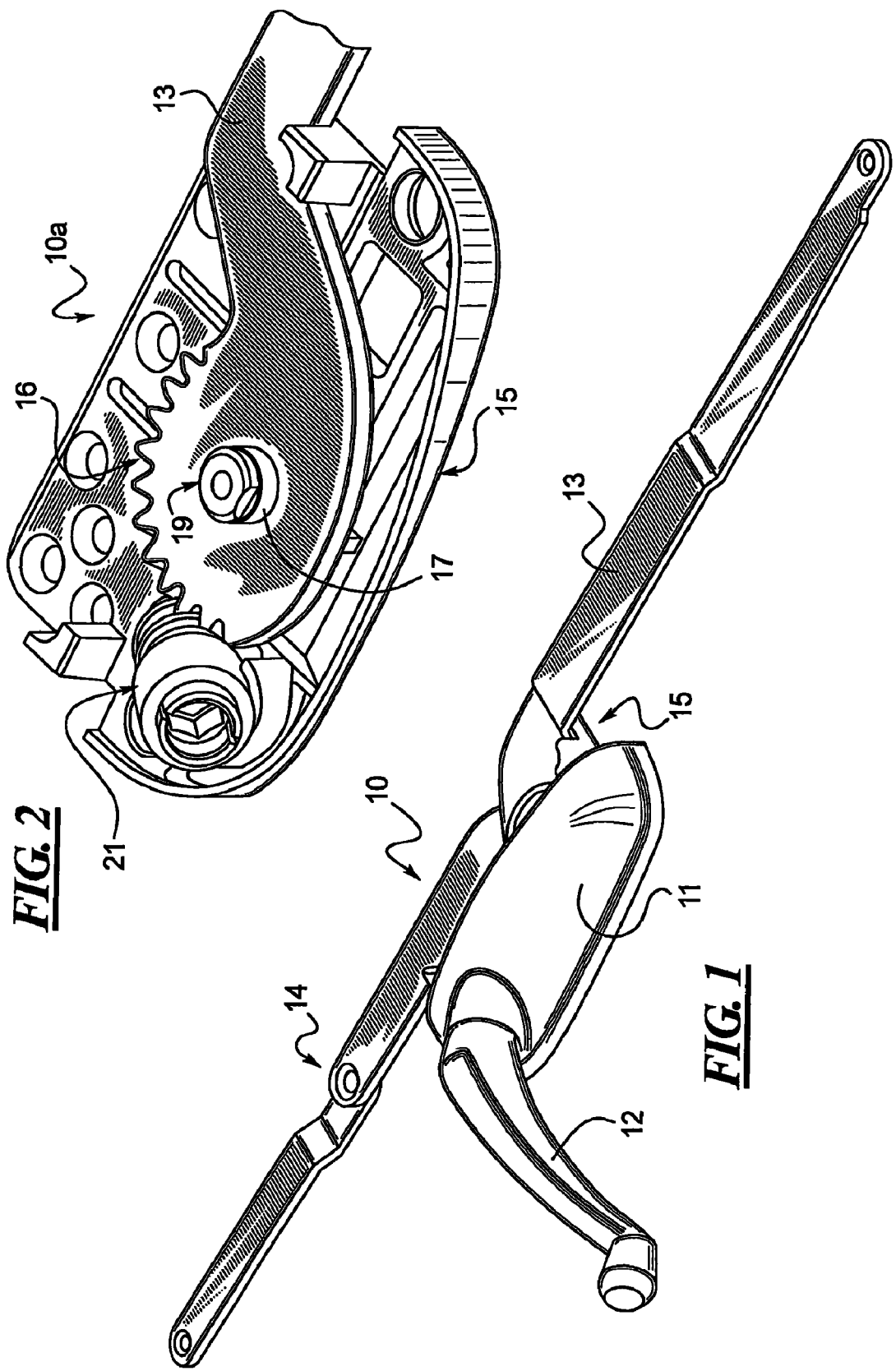

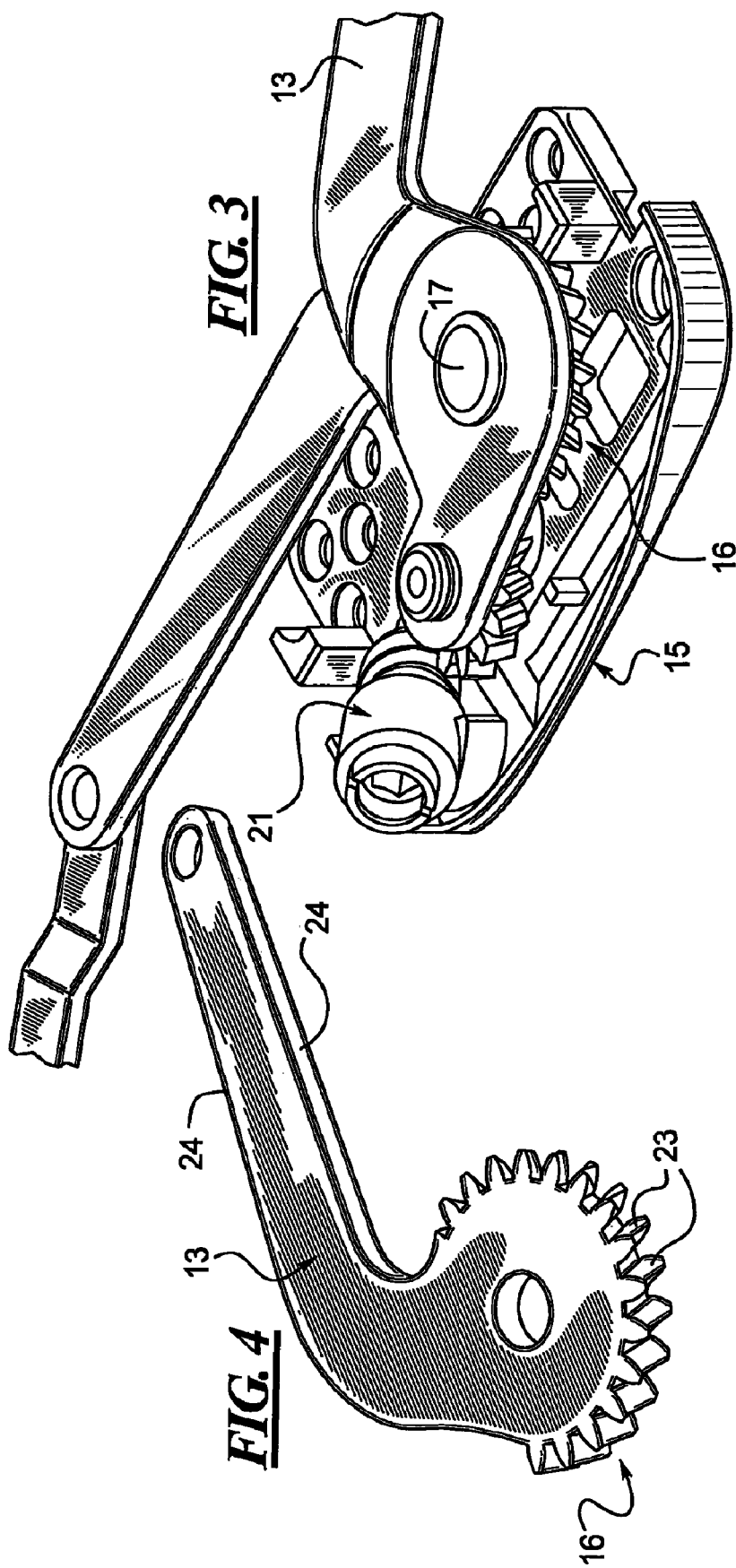

METHOD FOR FABRICATING HELICAL GEARS FROM PRE-HARDENED FLAT STEEL STOCK

TECHNICAL FIELD

An improved method of manufacturing helical or other non-vertically oriented gears from a pre-hardened flat steel stock is disclosed. An improved casement window operator made using the disclosed process is also disclosed.

DESCRIPTION OF THE RELATED ART

Casement window operators typically include a hand crank that drives a worm gear that is enmeshed with a gear sector disposed at one end of arm or lever which pushes the window sash open. The worm gear includes shafts at each end with one of the shafts being splined. The splined shaft is received in the end of the crank or handle. The worm gear and gear sector are partially accommodated within a housing or escutcheon with the splined shaft of the worm extending outward through the housing to mateably engage the crank. When the crank is turned, the worm gear causes the gear sector and arm to rotate which causes the sash to pivot on its hinges between open and closed positions.

Typically, the gear sector disposed at one end of the arm or lever includes helical teeth. The helical gear structure is needed to open and close the window without "backdriving" or an unintentional closing of the sash during windy conditions. Unfortunately, when the arm and gear sector are formed from a steel plate or steel sheet, the helical gear teeth cannot be stamped but must be specially machined or cut to achieve the helical configuration. Thus, the arm is stamped from a steel plate while the plate is in a softer state and then the teeth are cut by conventional means. After the teeth are cut, the resulting structure must be heat or induction treated to increase its hardness.

However, because of the strict standards imposed by the industry or casement window operators and components thereof, the fabrication of helical gear sectors for casement window operators by stamping the arm first and then cutting the teeth later has become problematic on two fronts.

First, casement operators must pass a life cycle test that requires the operator to be cycled for 8000 cycles under a heavy load to meet the specification, AAMA 901, set by the American Architectural Manufacturers Association. To meet this durability standard, the gear sector, arm and worm gear must be made from a material that has a Rockwell C hardness in the range of at least 40 and preferably in the 40~65 range. To meet this requirement, a hardenable carbon or stainless steel is preferred which enables the arm structure to be stamped from the sheet before the teeth are cut and the entire structure is heat treated for hardening purposes.

Second, the fenestration industry requires that any "coastally qualified" product be free from rust or corrosion after at least 2000 salt fog hours, in accordance with the standard ASTM B117. For the best corrosion resistance, a 304 series austenitic stainless steel is usually specified. However, austenitic stainless steels are not heat treatable and therefore the structure cannot be hardened after the teeth are cut. Thus, while austenitic stainless steels provide the best corrosion resistance, they fail to provide the needed hardness.

In summary, because the arm structure must be first stamped in a softer state, then hardened for durability after the gears are cut into the arm, a non-hardenable steel would not survive the durability test and a hardenable stainless steel would not pass salt fog testing.

To solve this dilemma, a stainless 300 series steel could be used if it were provided in an already hardened state which can only be achieved by work hardening. Instead of stamping the arm structure, the arm structure is cut by some other means, such as by a laser. Indeed, some 300 series stainless steels are available in a cold rolled processed form that provides a Rockwell C (HRC) hardness in the 40 range by progressive rolling and leveling. The use of a laser to cut the arm structure and the gears has been developed. However, using a laser to cut the entire structure has created a new set of problems.

Specifically, most laser applications use the power of the laser to cut perpendicular to the work surface. Laser programming, beam focal development and cutting parameters are well known in these "vertical" applications. Once a laser is used in an application that requires the laser to cut in any other orientation other than perpendicular, such as a helical gear sector, very specialized programming and unique laser cutting parameters must be developed.

Lasers typically need an oxygen assist gas that locally carburizes the steel and brings the local hardness up to the desired range. However, using oxygen also causes some oxidation of the steel in addition to the carburization.

To avoid oxidation, the cutting of stainless steel with a laser is typically performed by using a nitrogen assist or shielding gas to prevent local oxidation. Using a nitrogen assist as opposed to an oxygen assist increases the wattage needed to make the cut. As a result, a laser cutting stainless steel with a nitrogen assist uses significantly more wattage than a laser cutting a carbon steel with an oxygen assist. Another drawback to laser cutting with 100 percent nitrogen is the formation of a recast slag at the back side of the cut. In the gear areas, the laser must work more slowly which creates recast slag that is very difficult and cost prohibitive to remove.

In short, the use of an oxygen assist helps a laser cut using less wattage but would result in corrosion of stainless steel, since the stainless steel would become modified due to oxidation resulting in unwanted local heat build up at the cut interface. Using 100 percent nitrogen results in the recast slag problem. While cutting with an oxygen assist reduces or eliminates the recast slag problem, the cutting of a stainless steel with an oxygen assist will undermine the corrosion resistance of the finished product.

Therefore, there is a need for an improved technique for fabricating helical or non-vertical gears from a plate or sheet of pre-hardened steel or similar material that solves these problems.

SUMMARY OF THE DISCLOSURE

In satisfaction of the aforenoted needs, an improved method of manufacturing non-vertical gears from a pre-hardened sheet or plate is disclosed. The method comprises providing the pre-hardened sheet of stainless steel, cutting the gear teeth in the sheet using a laser with an oxygen assist and cutting the non-toothed portions of the gear in the sheet with the laser and a second gas consisting essentially of nitrogen. The cutting of the teeth with the oxygen assist and the cutting of the non-toothed portions of the structure can be performed in any order.

In a refinement, the stainless steel is a 300 series stainless steel. In a related refinement, the stainless steel is a type 304 stainless steel.

In another refinement, the gear teeth are helical gear teeth. In a related refinement, the helical gear teeth form an arcuate gear sector of helical teeth. In still another related refinement, the arcuate gear sector of helical gears comprises part of an arm or lever of a casement window operator assembly.

In another refinement, the second gas does not include significant amounts of oxygen.

In another refinement, the cutting of the non-toothed areas of the gear with the laser and the second gas is performed after the cutting of the gear teeth with the laser and an oxygen assist gas.

In another refinement, the resulting gear has a Rockwell C (HRC) hardness in the range of from about 40 to about 65.

A method is disclosed for manufacturing an arm for a casement window operator that includes a helical gear sector having a Rockwell C hardness in the range of from about 40 to about 65 and non-toothed portions from a pre-hardened sheet of stainless steel. The method comprises providing the pre-hardened sheet of stainless steel, cutting the helical gear teeth in the sheet using an assist gas and cutting the non-toothed portions of the gear in the sheet with the laser and a second gas consisting essentially of nitrogen.

In another refinement, the arm is rust resistant and meets the standard of ASTM B117.

In another refinement, the helical gears meet the standard of AAMA 901.

An improved helical gear sector for a casement window that meets the standards of ASTM B117 and AAMA 901 is disclosed. The helical gear sector is fabricated according to the following process: providing the pre-hardened sheet of 304 series stainless steel, cutting helical gear teeth in the sheet using a laser with oxygen and cutting the non-toothed gear portions of the gear sector in the sheet with the laser and a second gas consisting essentially of nitrogen and containing no substantial amounts of oxygen.

The preferred method is to cut the gear areas with oxygen and cut the rest of the gear with a 100% nitrogen gas. This methodology eliminates the recast and confines the oxygen corrosion to the gear area, which is heavily greased and within the die cast housing. The enclosure of greased gears within the escutcheon enables slightly oxidized gear surfaces to still meet the standards of AAMA 901. This is an acceptable combination and have been proven through many development iterations.

Other advantages and features of the disclosed methods and embodiments will become apparent upon reading the following detailed description and appended claims, and upon reference to the accompanying drawings.

BRIEF DESCRIPTION OF THE DRAWINGS

For a more complete understanding of this disclosure, reference should now be made to the embodiments illustrated in greater detail in the accompanying drawings and described below by way of examples.

FIG. 1 is a perspective view of the operator housing and dual arm drive mechanism made in accordance with this disclosure;

FIG. 2 is a perspective view of a base, worm drive assembly and bushing of a single arm drive mechanism partially shown the arm and helical gears;

FIG. 3 is a perspective view of the worm drive assembly, base and bushing of the dual arm mechanism of FIG. 1 showing another view of the helical gears disposed on the arm;

FIG. 4 is a top perspective view of the arm and helical gear sector for a casement window operator, such as the one shown above in FIG. 2;

FIG. 6 is a schematic flow diagram illustrating the disclosed methods of cutting arms and helical gears from flat, pre-hardened steel stock in accordance with this disclosure.

Figure 5:
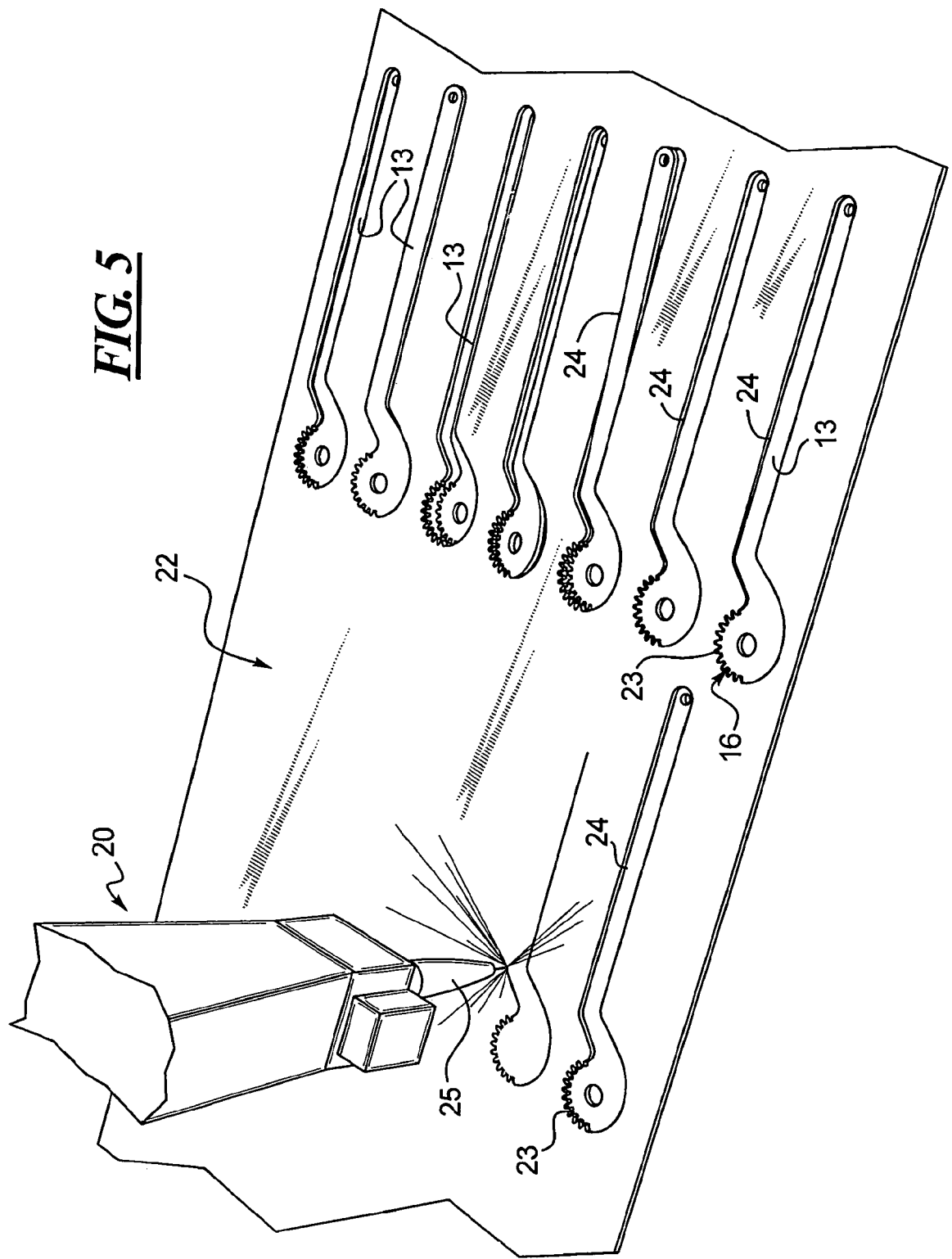
FIG. 5 is a top perspective view of a laser cutting a plurality of arms equipped with helical gear sectors as shown in FIG. 4 from a flat, pre-hardened sheet of steel or steel sheet stock in accordance with this disclosure.

It should be understood that the drawings are not necessarily to scale and that the embodiments are sometimes illustrated by diagrammatic representations and fragmentary views. In certain instances, details have been omitted which are not necessary for an understanding of the methods and embodiments of this disclosure or which render other details difficult to perceive. It should be understood, of course, that this disclosure is not necessarily limited to the particular embodiments illustrated herein.

DETAILED DESCRIPTION OF THE PRESENTLY PREFERRED EMBODIMENTS

FIG. 1 illustrates, in a perspective view, a split arm operator assembly 10 made in accordance with this disclosure which includes an escutcheon 11, a crank or handle 12, a driven arm or lever 13 and a second arm 14. The split arm operator assembly 10 also includes a base 15. The base 15 and escutcheon 11 form an enclosed housing for the drive mechanism.

FIG. 2 illustrates a base 15 configured for the arm 13 of a single arm drive mechanism 10a. The arm 13 is connected to or includes an arcuate gear sector 16 having an axis defined by the shaft 17 of the bushing 19. The gear sector 16 engages the worm gear 21 as shown.

The fabrication or manufacture of the arms shown at 13 and helical gear sectors shown at 16 in FIGS. 1-4 is the primary focus of this disclosure. However, this disclosure is also applicable the cutting of helical or generally non-vertically oriented gears from flat sheet stock. The disclosed process eliminates stamping and shaping and thereby eliminates at least two material movements resulting in reduced manufacturing time and cost.

FIG. 3 illustrates the base 15 configured from the dual arm drive mechanism 10 shown in FIG. 1. The helical gear sector 16 meshes with a second gear sector 22, which, in turn, is enmeshed with the worm gear 21. The pivoting arm or lever 13 pivots about the axis defined by the shaft 17.

Turning to FIG. 4, a perspective view of the arm 13 shown in FIG. 2 is shown, particularly illustrating the helical gear sector 16. FIG. 5 illustrates the operation of the laser 20 on a steel sheet 22 as the laser cuts out multiple arms 13.

The operation of the laser in accordance with this disclosure is as follows. Essentially, there are two cutting operations. The first cutting operation may involve the individual gear teeth 23 as opposed the non-toothed portions shown generally at 24 in FIGS. 4 and 5.

To cut the teeth 23, an assist or shielding gas is ejected from the nozzle 25 with the laser beam (see FIG. 5). During the cutting of the teeth 23, the assist gas is oxygen. The use of an oxygen assist gas enables the laser 20 to cut with less wattage and therefore reduces the occurrence of recast slag in the gear sector 16. Recast slag would be a problem in the gear sector 16 due to the relatively slow pace of the cutting of the individual gears 23. While the use of an oxygen assist gas does result in appreciable amounts of oxidation, the presence of slight amounts of oxidation on the individual gear teeth 23 or within the gear sector 16 is not problematic in terms of ASTM B117 as the gear teeth are contained with the escutcheon and are packed with or constantly coated with grease or lubricant. Therefore, the slightly oxidized, but constantly greased gear teeth 23 will satisfy the criteria of ASTM B117.

However, the non-toothed portions 24 of the arms 13 must be free of oxidation, corrosion and red rust for at least 2,000 salt fog hours per ASTM B117. Accordingly, after the individual teeth 23 are cut, the assist gas is changed from oxygen to nitrogen. Then, the non-toothed portions may be cut relatively quickly without any oxidation. Further, due to the relatively fast pace of the cutting of the non-toothed portions 24, recast slag is not a significant problem and, if it does occur, can be easily removed. Recast slag would be particularly problematic in the gear sector 16 and most likely would have to be removed by hand.

Therefore, a two-part laser cutting operation is carried out. The non-toothed portions of the structure or arm 13 are cut with the programmable laser and a 100% or near 100% nitrogen assist gas. The helical gear sector 16 is cut with $O_2$ gas. The oxygen assist gas eliminates potential recast slag problems in the gear sector 16. As noted above, the occurrence of oxidation in the gear sector 16 is not a problem due to its location within an escutcheon 11 and within constant coating with grease.

Using the above process, flat sheet stock of 304 austenitic stainless steel in a cold, rolled processed form can be utilized. Other 300 series stainless sheets or flat stock could be utilized in a pre-hardened state, such as cold, rolled processed form. The initial stock should have a Rockwell hardness of 40 or more.

Thus, the cutting of an arm 13 in accordance with this disclosure eliminates the separate stamping operation prior to cutting the gears with the laser. Further, the method of cutting helical gears in accordance with the disclosure also eliminates the need for any deburring or recast slag removal after the gears are cut. Finally, the method disclosed herein eliminates the subsequent heat treatment as the process is carried out on a pre-hardened flat steel stock. Thus, the disclosed methodology eliminates at least two material handling steps, thereby reducing the time and therefore the cost of manufacture.

While only certain embodiments have been set forth, alternative embodiments and various modifications will be apparent from the above description to those skilled in the art. These and other alternatives are considered equivalents and within the spirit and scope of this disclosure.

What is claimed:

1. A two-part method for cutting a casement window arm that includes a helical gear sector and an non-toothed arm portion, the stainless steel gear that includes helical gear teeth and non-toothed portions from a pre-hardened sheet of 300 series stainless steel, the method consisting of:
   providing the pre-hardened sheet of 300 series stainless steel having a Rockwell C hardness (HRC) ranging from about 40 to about 65;
   cutting the helical gear teeth in the sheet using a laser with an assist gas consisting of oxygen; and
   cutting the non-toothed portions of the gear in the sheet with the laser and a second gas consisting of nitrogen.

2. The method of claim 1 wherein the stainless steel is a type 300 series stainless steel.

3. The method of claim 1 wherein the helical gear teeth form an arcuate gear sector of helical gear teeth.

4. The method of claim 3 wherein the arcuate gear sector comprises part of a casement window operator.

5. The method of claim 4 wherein the arcuate gear sector comprises part of an arm of a casement window operator.

6. The method of claim 1 wherein the cutting of the non-toothed areas of the gear with the laser and the second gas is performed before the cutting of the gear teeth with the laser and the first gas of oxygen.

7. The method of claim 5 wherein the cutting of the non-toothed areas of the gear with the laser and the second gas is performed before the cutting of the gear teeth with the laser and the first gas mixture.

8. A two-part method for cutting an arm for a casement window operator that includes a helical gear sector having a Rockwell C hardness (HRC) is in the range of from about 40 to about 65 and non-toothed portions from a pre-hardened sheet of stainless steel, the method consisting of:
   providing the pre-hardened sheet of type 300 series stainless steel having a Rockwell C hardness (HRC) ranging from about 40 to about 65;
   cutting the helical gear teeth in the sheet using a laser with an assist gas consisting of oxygen; and
   cutting the non-toothed portions of the gear in the sheet with the laser and a second gas consisting of nitrogen.

9. The method of claim 8 wherein the cutting of the non-toothed areas of the arm with the laser and the second gas is performed before the cutting of the helical gear teeth with the laser and the first gas.

10. The method of claim 8 wherein the cutting of the non-toothed areas of the arm with the laser and the second gas is performed before the cutting of the gear teeth with the laser and the first gas.

* * * * *